(12) United States Patent
Nguyen et al.

(10) Patent No.: US 6,379,627 B1
(45) Date of Patent: Apr. 30, 2002

(54) GAS GENERATOR

(75) Inventors: Andrew C. Nguyen; Randel L. Hoskins, both of Bothell, WA (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 07/803,530

(22) Filed: Dec. 9, 1991

(51) Int. Cl.[7] ............................................... B32B 15/20
(52) U.S. Cl. ........................ 422/165; 422/166; 422/167; 422/168; 280/728.1; 280/732; 280/736; 280/740; 280/741; 280/742
(58) Field of Search ................................. 422/165, 166, 422/167, 168; 280/728.1, 732, 736, 740–742

(56) References Cited

U.S. PATENT DOCUMENTS

| 3,912,458 | A | * | 10/1975 | Fukuma et al. | ............. 280/728 |
|---|---|---|---|---|---|
| 4,005,876 | A | * | 2/1977 | Jorgensen et al. | ........... 102/531 |
| 4,012,211 | A | * | 3/1977 | Goetz et al. | ................. 250/740 |
| 4,322,385 | A | * | 3/1982 | Goetz | ......................... 280/740 |
| 4,858,951 | A | * | 8/1989 | Lerizen | ....................... 280/741 |
| 4,878,690 | A | * | 11/1989 | Cunningham | ................ 280/741 |

FOREIGN PATENT DOCUMENTS

JP          4520843       * 12/1966     .................. 422/168

* cited by examiner

Primary Examiner—Laura Edwards
(74) Attorney, Agent, or Firm—Lyon, P.C.

(57) ABSTRACT

A solid propellant gas generator incorporating staged gas cooling and filtration so as to generate cool, clean gases having a composition suitable for use as automobile airbag inflator.

6 Claims, 2 Drawing Sheets

GAS GENERATOR

BACKGROUND OF THE INVENTION

The composition of the gas stream emanating from an automobile airbag inflator is subject to strict requirements to avoid toxicity concerns. Generally, solid propellant gas generators produce unacceptable byproducts which must be removed from the gas stream prior to exiting the gas generator. Due to the high temperatures involved in burning solid propellants, many of the unacceptable byproducts are in the form of liquids or gases which are difficult to remove unless the gases are cooled to the point where the undesirable byproducts convert to solids which can be filtered out or to liquids which solidify in contact with cool surfaces of the gas generator.

The conventional approach to solving the aforesaid problem has been to direct the hot propellant gases directly into a coolant/filter mass and rapidly cool the gases down in a single step to the point where the undesirable solid liquid byproducts are removed. However, a problem is presented by this approach in that rapid cooling of the gases may stabilize the propellant combustion products in a manner that leads to unacceptably high levels of undesired gases.

For example, in airbag inflators, low levels of NO and CO in the-effluent gases are mandated. When a stoichiometric propellant containing N, C and Q is burned, the quantity of NO and CO produced is a function of the propellant combustion temperature. More Co and NO are formed at higher temperatures. If as in a conventional system, the combustion gases are quenched in a single step to a temperature at which the gas reaction rates are reduced to essentially zero, unacceptably high CO and NO levels resulting from the resultant propellant combustion temperature equilibrium condition may be produced.

SUMMARY OF THE INVENTION

The inventive concept of the present invention is to solve the aforesaid problem by using a gas generator which incorporates staged cooling and filtering to achieve the desired gas outlet properties. With sufficient residence time between stages, the CO and No equilibrium condition can be shifted to relatively low, acceptable, CO and NO concentrations. In one embodiment of the invention, cooling of the propellant combustion gases in stages is achieved by alternate radial and circumferential flow of gas. However, the concept is also applicable to axial flow gas generators.

More, specifically, upon receipt of an initiation signal, an initiator or squib ignites a solid propellant which burns rapidly, evolving gas, liquid and solid byproducts. The evolving propellant gases pressurize the inside of a propellant tube. When internal pressure in the propellant tube reaches a predetermined level, a burst foil on the inside thereof ruptures allowing the propellant gases to flow radially outwardly through the perforated wall of the propellant tube, thence through slagging screens into a surrounding plenum defined by a baffle tube. Initial cooling of the combustion products to an intermediate temperature is achieved as the combustion products pass through the slagging screens. High freezing temperature and solid byproducts are initially filtered out by the slagging screens. The gases are further cooled in the plenum by heat transfer to the baffle tube wall. Additional solids removed is achieved-by impact plating on the radially inner wall of the baffle tube. The size of the plenum is designed to provide a sufficient average residence time such that the CO and NO concentrations can shift toward relatively low equilibrium concentrations associated with lower gas temperature within the plenum.

The propellant gases then exit the plenum by first moving circumferentially then radially through axially aligned relatively large openings in the surrounding baffle tube. The propellant gases then enter cooling screens wrapped around the baffle tube and flow circumferentially in opposite directions through the screens to exhaust orifices located on the opposite side of the generator housing from the openings in the baffle tube.

As the gases flow through the aforesaid paths they are cooled relatively slowly to induce shifting of CO and NO to even lower concentrations. The coolant screens cool the gases to a desired exit temperature and filter out any remaining condensible liquid or solid propellant byproducts that may be entrained therein.

The propellant gases then exhaust radially from the gas generator via orifices in the generator housing. Depending upon ballistic requirements, the orifices may or may not be sealed with a burst shim.

BRIEF DESCRIPTION OF THE DRAWINGS

FIG. 3 is a cross-sectional view taken along the line 3—3 of FIG. 2.

DETAILED DESCRIPTION OF THE PREFERRED EMBODIMENT OF THE INVENTION

Figure 1:
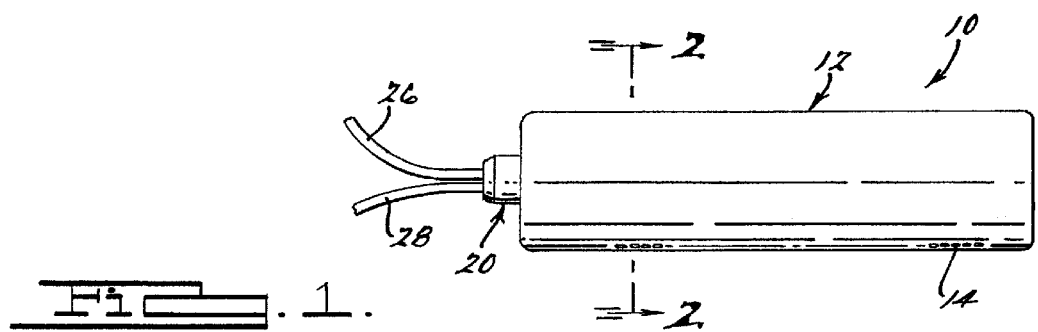
FIG. 1 is a side elevation of a gas generator in accordance with the present invention.
Figure 2:
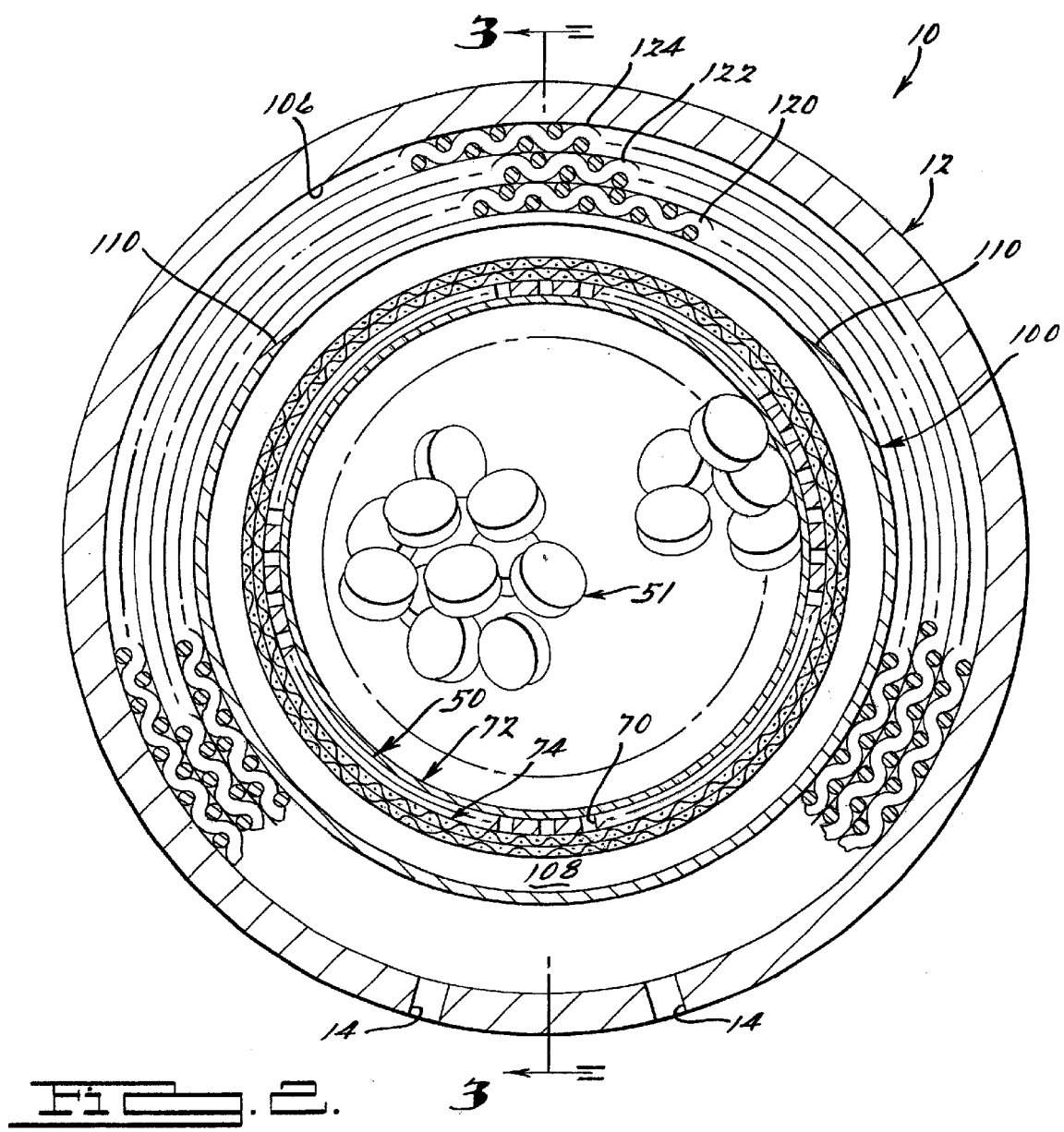
FIG. 2 is a cross-sectional view taken along the line 2—2 of FIG. 1.
Figure 2:
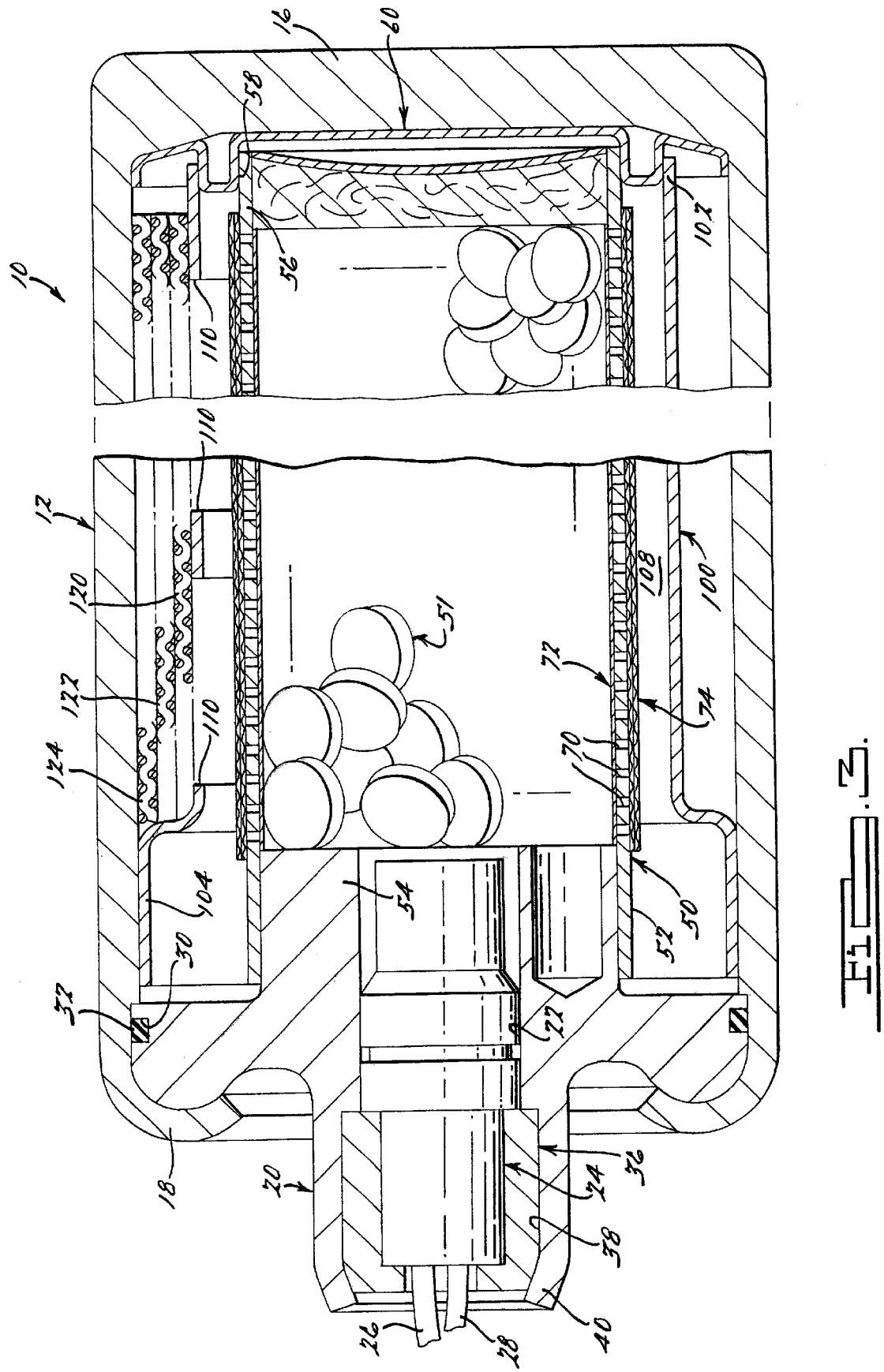

As seen in the drawings, a gas generator 10, in accordance with an exemplary constructed embodiment of the invention, comprises a housing 12, for example, an aluminum forging. The housing 12 is provided with a plurality of gas discharge orifices 14 arranged, in the constructed embodiment, in two longitudinally extending rows spaced apart circumferentially approximately 300 relative to one another. The housing 12 has an integral end closure 16 at one end and is open at the opposite end 18 for the acceptance of an end closure 20. The end closure 20 has a central bore 22 for the acceptance of a conventional squib 24. The squib 24 is provided with a pair of electrical conductors 26 and 28 to facilitate electric ignition of an explosive charge contained therein.

The end closure 20 is provided with an O-ring groove 30 for the acceptance of a conventional O-ring 32 to insure sealing of the housing 12. The end portion 18 of the housing 12 is reentrantly folded about the end closure 20 to mechanically retain the end closure 20 against an internal shoulder 34 on the housing 12. The squib 24 is secured within the end closure 20 by a bushing 36 which is accepted in a complementary bore in the end closure 20. An axially outer end portion 40 of the end closure 20 is folded radially inwardly to lock the bushing 36 in its complementary bore 38.

A cylindrical propellant tube 50 supports a plurality of propellant grains 51 internally thereof. The tube 50 has one end portion 52 supported by and telescoped over a complementary cylindrical boss 54 on the end closure 20 and an opposite end portion 56 disposed within a complementary circular recess 58 in end clip 60 which is seated against the closed end portion 16 of the housing 12.

The propellant tube 50 is provided with a plurality of relatively small apertures 70 in a staggered pattern such that approximately 25–40% of the tube 50 is open, as dictated by application requirements. The apertures 70, in the constructed embodiment of the invention, are 0.063' in diameter. The inside of the propellant tube 50 is provided with a burst foil. 72 which facilitates pressure buildup and flame front propagation through the propellant grains 51 disposed internally of the propellant tube 50. The propellant tube 50 is surrounded by a first filter screen 74 comprising one or more layers of 20 mesh wire having a wire diameter of 0.023'.

In accordance with one feature of the invention, a baffle tube 100 is telescoped about the propellant tube 50 in radially spaced relation to the slagging screen 74 thereon.

One end portion 102 of the baffle tube 100 is supported by the end clip 60 and an opposite end portion 104 of the baffle tube 100 extends radially outwardly to engage an inner wall surface 106 of the housing 12 so as to radially position the baffle tube 100 relative thereto and to the propellant tube 50. The baffle tube 100 defines a plenum 108 radially outwardly from the slagging screen 74.

The baffle tube 100 is provided with a plurality of relatively large apertures 110 which are axially aligned with one another and extend through an arc of approximately 100°. The apertures 110 in the baffle tube 100 are diametrically oppositely related to the discharge orifices 14 in the housing 12 for a reason to be discussed.

The baffle tube 100 is surrounded by a plurality of final filter coolant screens 120, 122 and 124 comprising, for example, a 10 mesh screen 120 made from 0.035" wire, a 20 mesh screen. 122 made from 0.023" wire, and a 10 mesh screen 124 made from 0.035" wire, respectively. The three coolant screens 120, 122 and 124 are coextensive circumferentially and extend through an arc of approximately 270°. The resultant 90° opening in the screens 120, 122 and 124 is oriented in radial alignment with the orifices 14 in the housing 12. Stated in another manner, the mid point of the screens 120, 122 and 124 is disposed in radial alignment with the apertures 110 in the baffle tube 160. Accordingly, gases exiting from the propellant tube 50 flow through the apertures 70 therein, pass through the surrounding slagging screen 74 and enter the plenum 108 defined by the space between the slagging screen 74 and the radially inner wall of the baffle tube 100. Both liquids and solids in the gas stream are deposited or, in other words, impact filtered, on the radially inner wall of the baffle tube 100. Thereafter, the gases flow circumferentially along the radially inner wall of the baffle tube 100 to the apertures 110 therein, thence radially outwardly through the apertures 110 in the baffle tube 100, thence circumferentially of the baffle tube 100 within the screens 120, 122 and 124 surrounding the baffle tube 100 and within the inner wall of the housing 12 to exit through the orifices 14 in the housing 12.

From the foregoing it should be apparent that the gas generator of the present invention provides for staged cooling of the gases generated which allows both the time and temperature conditions to be controlled and thereby allows the gas equilibrium conditions to shift to more benign conditions, for example, lower CO and NO levels. The gas generator of the invention has a number of applications where cool, clean, non-toxic gases are required. While the invention has been disclosed in the context of an automobile air bag application, the utility of the invention in other applications is obvious.

While the preferred embodiment of the invention has been disclosed, it should be appreciated that the invention is susceptible of modification without departing from the scope of the following claims.

We claim:
1. A gas generator comprising,
   a propellant container having a plurality of relatively small apertures therein;
   a propellant in said propellant container; means in said gas generator communicating with said propellant container for igniting said propellant;
   a baffle enclosure disposed about said propellant container in spaced relation thereto so as to define a plenum therebetween, said baffle enclosure having a plurality of localized apertures for the discharge of gas therefrom;
   a generator housing disposed about said baffle enclosure in spaced relation thereto and having a plurality of localized gas discharge orifices on an opposite side thereof from the apertures in said baffle enclosure; and
   a final coolant screen disposed between said baffle enclosure and generator housing in juxtaposed relation thereto;
   whereby gases produced in said propellant container flow therefrom through said plenum so as to impinge and condense on an inner wall of said baffle enclosure, said gases then being constrained to flow circumferentially in one direction along the interior wall of said baffle enclosure to the apertures therein, thence radially outwardly through said baffle apertures, thence circumferentially in an opposite direction through said final coolant screen to the discharge orifices in said generator housing.

2. A gas generator in accordance with claim 1 including a first filter screen disposed about the exterior of said propellant container.

3. A gas generator in accordance with claim 1 including a burst foil on the interior of said propellant container.

4. A gas generator in accordance with claim 1 wherein the apertures in said baffle enclosure extend through an arc of approximately 100°.

5. A gas generator in accordance with claim 1 wherein said final coolant screen extends through an arc of approximately 270° and the circumferential midpoint thereof is radially aligned with the apertures in said baffle enclosure.

6. A gas generator comprising, a propellant container having a plurality of relatively small apertures therein;
   a propellant in said propellant container;
   means in said gas generator communicating with said propellant container for igniting said propellant;
   a baffle enclosure disposed about said propellant container in spaced relation thereto so as to define a plenum therebetween, said baffle enclosure having a plurality of localized apertures on one side thereof for the discharge of gas therefrom;
   a generator housing disposed about said baffle enclosure in spaced relation thereto and having a plurality of localized gas discharge orifices on an opposite side thereof from the apertures in said baffle enclosure; and
   a screen disposed between said baffle enclosure and generator housing in close juxtaposed relation thereto;
   whereby gases produced in said propellant container flow radially therefrom through said plenum so as to impinge and condense on an inner wall of said baffle enclosure, said gases then being constrained to flow circumferentially in one direction through said plenum along the interior wall of said baffle enclosure to the apertures therein, thence circumferentially in an opposite direction through said screen to the discharge orifices in said generator housing.

* * * * *